June 27, 1967   R. R. KOOIMAN   3,327,533
PRESSURE RESPONSIVE VIBRATION DEVICES
Filed Feb. 17, 1964   2 Sheets-Sheet 1
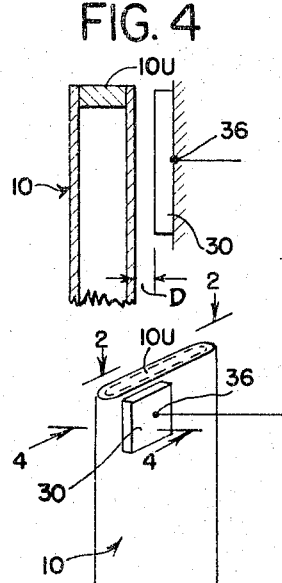
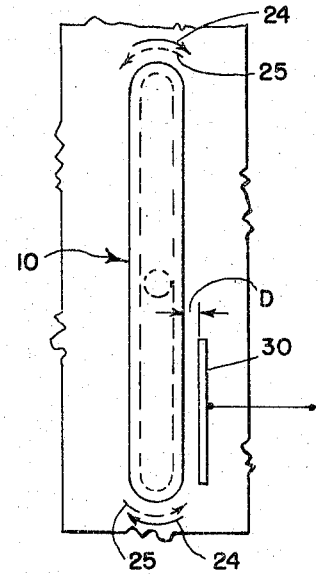
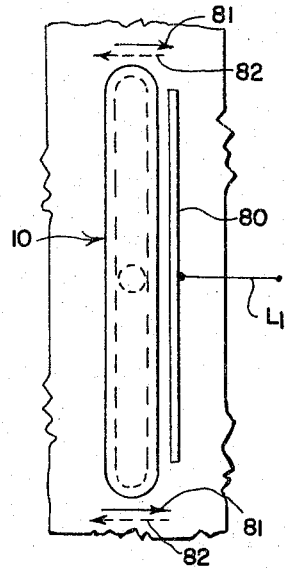
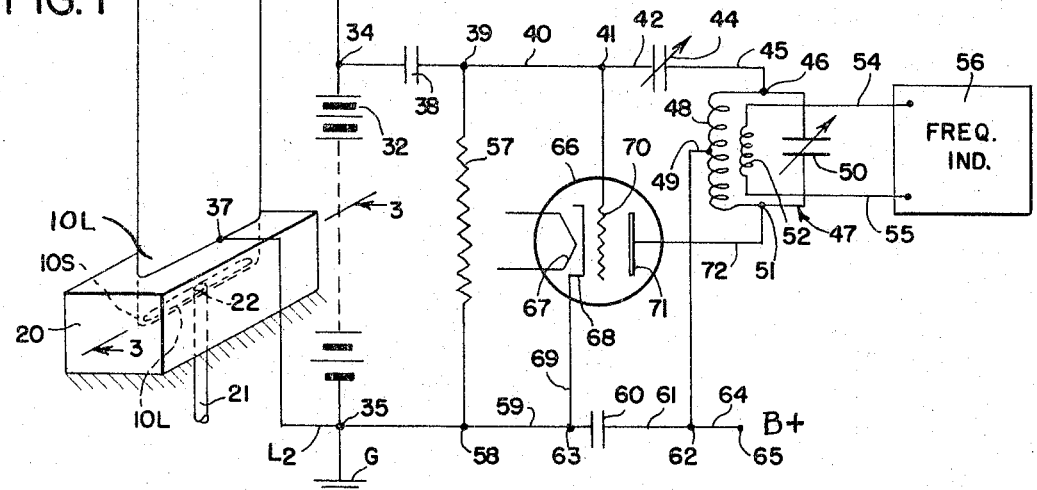
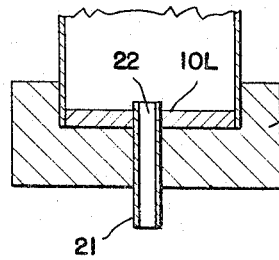
INVENTOR.
ROBERT R. KOOIMAN
BY
Dugger, Braddock, Johnson & Westman
ATTORNEYS INVENTOR.
ROBERT R. KOOIMAN
BY
Dugger, Braddock, Johnson & Westman
ATTORNEYS United States Patent Office 3,327,533
Patented June 27, 1967

3,327,533
PRESSURE RESPONSIVE VIBRATION DEVICES
Robert R. Kooiman, Eden Prairie, Minn., assignor to Rosemount Engineering Company, Minneapolis, Minn., a corporation of Minnesota
Filed Feb. 17, 1964, Ser. No. 345,480
3 Claims. (Cl. 73—398)

This invention relates to vibrating tube devices, and more particularly to vibrating tube devices which can be used as a frequency standard, or as a pressure or temperature sensor.

It is an object of the present invention to provide improved vibrating tube devices and more specially to provide vibrating tube devices which may be used as a frequency standard or as a pressure or temperature sensor. It is another object of the invention to provide vibrating tube devices which are more stable than devices heretofore available in respect to supervening variances in the environment in which the device is operated. More particularly, it is an object of the invention to provide a vibrating tube frequency standard of stable characteristics and long life, resistant against aging, and having low losses and low coefficient of frequency change in respect to variations of temperature in the environment. Another object of the invention is to provide a frequency standard device wherein it is unnecessary or less necessary to make expensive and costly provision for providing constancy of the environmental temperature and other factors of the environment in which the instrument is situated and operates. It is a further object of the invention to provide improved temperature and pressure sensors having a low level of error attributable to the material of which the sensor is composed.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative however, of but a few of the various ways in which the principles of the invention may be employed.

The invention is illustrated with reference to the drawings wherein:

FIGURE 1 is an isometric view, together with a circuit diagram illustrating one form of vibrating tube apparatus of the present invention;

FIGURE 2 is a plan view taken in the direction of arrows 2—2 of FIGURE 1, illustrating the free end of the vibrating tube mechanism;

FIGURE 3 is a longitudinal sectional view through the major median plane of the vibrating tube and its mounting, taken in the direction of arrows 3—3 of FIGURE 1;

FIGURE 4 is a fragmentary transverse longitudinal sectional view taken along the line and in the direction of arrows 4—4 of FIGURE 1;

FIGURE 5 is an end view, corresponding to FIGURE 2, showing a slightly modified form of vibrating tube, from the present invention;

Throughout the drawings, corresponding numerals refer to the same parts.

Figure 6:
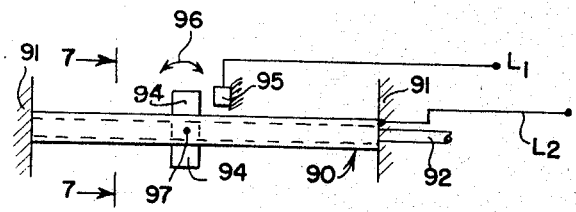
FIGURES 6 and 7 illustrate another embodiment of the invention, FIGURE 6 being a side elevational view and FIGURE 7 a transverse sectional view taken along the line and in the direction of arrows 7—7 of FIGURE 6.

According to this invention there is provided a vibrating tube of a non-circular configuration having major and minor cross-sectional axes and a longitudinal axis and closed at its ends. With no differential pressure applied to the walls of the tube, such a tube will exhibit a certain bending stiffness as measured in a direction normal to the longitudinal and major cross-sectional axes, and a certain stiffness against twisting about its longitudinal axis. When a differential pressure is applied to the walls of the tube the cross-sectional shape will be changed and these stiffness factors will likewise be changed.

A variety of non-circular configurations, such as flat or oval or elliptical or lenticular configurations may be used. There are many non-circular shapes that are suitable. A tube having flat or gently curved, proximate sidewalls and more sharply curved edges as considered in section, is useful in many instances and is illustrated in FIGURE 1 thereof. For the purposes of invention it is only necessary that the cross-sectional shape be non-circular and that the tube exhibit a different restraint to bending when measured about the major axis of the cross-sectional shape than when measured about the minor axis of the cross-sectional shape. The fact of non-circularity of the tube will insure that the tube will change its cross-sectional configuration when subjected to differential pressure.

According to the present invention, the vibrating tube is so constructed and equipped so as to permit application of differential pressure to at least a portion of the wall of the tube. In its simplest form, this is accomplished by closing the ends of the tube and evacuating it or sealing in the tube a quantity of gaseous or liquid fluid. When then subjected to varying pressure or if placed in a container and subjected to varying pressure (or vacuum) or if the tube contains fluid and is subjected to variations in temperature, a differential pressure will be imposed on the walls of the tube and its stiffness will be varied. In other exemplifications of the invention a pressure connection can be let into the vibrating tube for varying the pressure applied to the interior thereof. Any of these means can be utilized for applying a differential pressure to the walls of the tube.

A vibrating tube thus provided with means for applying a differential pressure to the walls of the tube, is then mounted at its end for vibration transversely in a direction normal to a plane through the major axis of the cross-section of the tube, or the tube may be mounted for torsional vibration about the longitudinal axis of the tube.

The mounting of the tube is by means of a fixed frame piece at one or both of the ends of the tube. It is possible to vibrate the tube transversely or torsionally with either a one-end mounting or a two-end mounting at the ends of the tube.

The types of vibratory drives that can be used for vibrating the tube will depend upon the materials of which the tube is made and the frequency of vibration. The drive may be magnetic, capacitative, piezoelectric or magneto strictive.

According to this invention, the interior of the tube may be connected to a pressure source or the tube may be completely sealed and mounted within the container in which the pressure is introduced and pressure (or vacuum) thus applied to the exterior of the tube. A quantity of gas may be contained in the tube, as where the device is used for a pressure or frequency standard (for compensating the device) or for the measurement of temperature. Any pure gas may be used as the filling gas. Helium or other rare gases are useful since they remain gaseous at low temperatures. In some instances, the tube may be filled with fluid such as an oil filling, as where the expansion of the oil within the tube under conditions of varying temperature is relied upon to apply differential pressure, as indicative of temperature.

The vibrating tubes of the present invention are made in each instance of a single crystal of a material selected from the class consisting of quartz, which is substantially non-aging, the substantially non-aging element semiconductors, such as germanium and silicon, and the substantially non-aging semi-conductor compounds such as indium antimonide, gallium antimonide and silicon carbide. Single crystals of silicon and germanium are presently preferred because of favorable cost and because single crystals of these materials are available in sizes suitable for use in making the larger sizes of vibrating tube structure of this invention. Single crystals of germanium and silicon are also preferred because these materials have been shown to be substantially free from aging effects, see Patent 2,998,575. Single crystal quartz, while not as free from aging as is silicon and germanium, is considered as substantially non-aging within the purview of this invention, since its stability and accuracy characterstics when used as a vibratory member are vastly superior to those of metal structures used as vibratory members, and for this reason quartz has long been used in making frequency standards. All of the aforesaid materials exhibit exceptionally low energy loss when subjected to vibration.

Referring to the embodiments of the invention illustrated in FIGURES 1–4, there is provided a tube 10 which is closed at its upper end 10U and its lower end 10L. A short portion 10S at the lower end of the tube is seated in a slot within the mounting block 20 and is attached by glass fusion, soldering or welding in place. The upper end 10U of the tube is unsupported and is free to vibrate. Extending through the block 20 there is a tubular connection 21 which is let into the interior of the tube 10 at 22. The tube 21 may be used for communicating pressure into the interior of the tube 10, or as later explained, it may be sealed off after a charge of gas or liquid has been placed inside of the tube 10.

Upon a firm support not illustrated there is mounted a capacitive plate 30. The plate 30 is spaced from the exterior surface of the tube 10 by a dimension D, see FIGURE 2, this dimension being sufficient so that when the tube 10 is vibrated, torsional or transversely, torsionally in this instance as illustrated by the solid arrows 24—24 and the dotted arrows 25—25, the tube 10 will never engage the surface of the plate 30 but will merely change its distance from the plate during the course of the vibration.

As shown in FIGURE 1, a battery 32 is provided. The battery 32 is connected to the junctions 34 and 35 the latter being grounded at G. Line L1 extends from the positive junction 34 of the battery to a connection 36 at the plate 30. Another line L2 extends from the negative junction 35 of the battery to a connection 37 on the tube 10. Usually a connection can be made to block 20, since it is normally in electrical conductive relationship with the lower end 10L of the tube 10. However, it is conceivable that the support 20 might be made of electrically non-conductive materials, in which case the connection 37 is made directly to the tube 10. Where the surface of tube 10 is not electrically conductive, a conductive coating is applied. From junction 34, a circuit extends through capacitor 38 to junction 39 and thence via line 40 to junction 41 and thence via line 42 through a variable condensor 44 and via line 45 to junction 46 on the tank circuit generally designated 47. The tank circuit is composed of an inductance 48 having a center tap 49 and a variable capacitance 50. Each of the inductance 48 and variable capacitance 50 has one of its terminals connected to the junction 46 in the opposite terminal to the junction 51 of the tank circuit. A read-out coil 52 is mounted in inductively coupled relationship to the coil 48 and a voltage is induced therein having the frequency of the current flowing in the coil 48. The read-out circuit is connected via lines 54 and 55 to a frequency responsive instrument 56. From junction 39 a circuit extends through resistor 57 to junction 58 on line 59 which is connected to junction 35. Line 59 also extends through junction 63, thence to the capacitor 60 and thence through line 61 to junction 62 which is connected via line 64 to the B plus power supply terminal 65. A thermionic oscillator tube is provided at 66. This tube has a cathode heater 67, and emitter 68 heated thereby. Cathode 68 is connected via line 69 to junction 63 on line 59. The oscillator grid 70 is connected to junction 41 on line 40 and oscillator anode 71 is connected via line 72 to junction 51 on the tank circuit 47.

The resultant circuit is one well-known form of oscillator. Any suitable oscillator circuit may be used for energizing the driving plate 30 (or equivalent coil or motivating device) for inducing vibration of the vibratory tube 10, pursuant the present invention.

Oscillatory energy from the control electrode 70 and anode circuit 71–72 of the oscillator (the energy from the latter circuit being fed back through capacitor 44) will tend to excite the vibratory tube 10 into vibration, the vibration to this extent is due to the varying attractive force between the plate 30, which acts as a capacitor plate, and the adjacent electrically conductive surface of the vibratory tube 10. Since this force is displaced from the axis of the tube 10, it will (in FIGURES 1–4) excite the tube 10 into torsional vibration. The vibration of the tube 10 becomes of maximum amplitude when capacitor 50 is adjusted to tune the anode circuit precisely to the resonant frequency of the vibratory tube 10. In the vicinity of the resonant frequency of vibratory tube 10, the vibration of the tube 10 will control the oscillation in the tank circuit 47 with an extremely high degree of precision.

It is known to use a vibratory element such as a bar of silicon or germanium, as a vibratory element, but in such devices, provision must be made for compensating the frequency of vibration against supervening environmental changes such as temperature changes. According to the present invention, where the device illustrated is used as a frequency standard, the frequency variations due to change in temperature of the environment may be compensated by enclosing within the tube 10 a certain "trapped" amount of fluid, as for example, by connecting tube 21 to a bulb, or by merely sealing the tube 21 off after a certain quantity of gas or a filling of liquid has been introduced into the tube 10. Thereafter, changes in temperature of the environment will cause differential expansion between the fluid filling the tube and the tube itself, thereby cause a slight change in the cross-sectional configuration and hence of the "stiffness" of the tube 10, to the end that compensation in the frequency of vibration is self-contained even though the temperature may vary.

The same device shown in FIGURES 1–4 may be used as a pressure sensor by connecting tube 21 to a source of pressure to be measured. By changing the pressure applied at tube 21 a slight change can be made in the cross-sectional configuration of the tube 10, and hence, in its stiffness and accordingly in its frequency of vibration. In this way, pressure changes are sensed as changes in the natural frequency of vibration of the tube 10, which is read-out at 56.

The same device may be used as a temperature sensor, by connecting tube 21 to a pressure bulb or by merely sealing off tube 21 after a certain amount of liquid or gas has been placed inside of the vibrating tube 10. Thereafter, the changes in temperature induce certain changes in the cross-sectional configuration in the tube 10 with consequent changes in its stiffness and frequency of vibration, and therefore the temperature change may be read out at the frequency indicating instrument 56, by suitable calibration.

In FIGURE 5, the device is precisely as in FIGURES 1-4, except that plate 30 of FIGURES 1 and 2 is now replaced by a plate 80, which extends across the full width of the tube and is positioned symmetrically with reference to the longitudinal axis of the vibratory tube 10, with the result that the forces induced between the tube 80 and the surface of the vibrating tube 10, are applied normal to the longitudinal and major cross sectional axes of the tube 10, and hence symmetrically. This will cause only a back and forth vibratory motion as shown by the arrows 81 and 82. In this way, a straight transverse vibration rather than a torsional vibration is provided.

Figure 7:
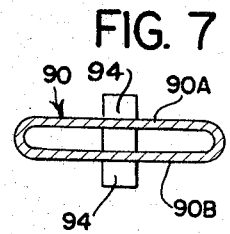

Referring to FIGURES 6 and 7, in this embodiment of the invention, the tube generally designated 90 has its opposite ends firmly attached to the supports 91—91. The tube can be of any non-circular configuration such as described with reference to FIGURES 1-5, and is illustrated in FIGURE 7 as being a flat tube. The tube 90 has an inlet connection 92 at one end extending through one of the supports 91, and it will be understood that such inlet connection 92 can be sealed off after a charge of liquid or fluid has been placed within the vibrating tube 90, or may be connected to a source of pressure, all depending on the particular use to which the device is put and its manner of use. Midway between the ends of the tube 90 there are provided solid protuberances 94—94 which may extend all the way through the opposite walls of the tube 90, as shown in the cross-sectional view, FIGURE 7. These protuberances are in effect, one member which fastens the two walls 90A-90B together midway between the ends of the tube. It is noted, however, that the protuberances 94—94 do not form a web extending across the tube 90, or if it does form a web then apertures are then provided through the web so as to permit pressure communications from end to end within the vibrating tube 90. Alternately, the protuberance may be mounted on the exterior surface only of the tube. In addition to serving as a support for the motivating electrode the protuberance may be used for temperature compensation when the tube is used as a frequency standard or pressure sensor. Compensation is achieved by appropriate material selection of the protuberance so that its temperature coefficient of expansion is different than that of the tube. The protuberance adds inertia to the vibrating tube thereby partially determining its resonant frequency. If the expansion coefficient of the protuberance is lower than that of the tube its effect will be to increase the resonant frequency of the tube as the temperature is increased. This effect is utilized to compensate for the normal decrease in material frequency of, for example, a silicon or germanium tube due to a lowering of the elastic modulus of these materials as the temperature is increased. Such protuberance may be utilized in any of the designs shown. The protuberance 94—94 extends outwardly from the walls 90A-90B equally from each wall. Adjacent one face of the protuberance there is mounted a motivating device 95, which can, for example, be a condenser plate, coil, etc., depending upon the type of motivation being used. It is here illustrated as a condenser plate. It is mounted on any suitable structural framework, not shown, so that the plate 95 is closely spaced from one of the faces of the protuberance 94. Line L1 is connected to the plate 95, line L2 is connected to the tube 90. An oscillating circuit such as shown in FIGURE 1, may be used. The effect is that upon inducing the initial vibration, a force will be induced between the plate 95 and the adjacent face of the protuberance 94, and will cause back and forth vibration of the protuberance 94, as shown by the double arrow 96, and this produces an oscillatory bending moment in a transverse way about an axis which is horizontal through the median plate of the tube 90, at the point 97. The oscillation will continue so long as power is applied, and the frequency of oscillation will be dependent upon characteristics of the tube, and upon the differential pressure which is applied to the walls of the tube.

Figure 8:
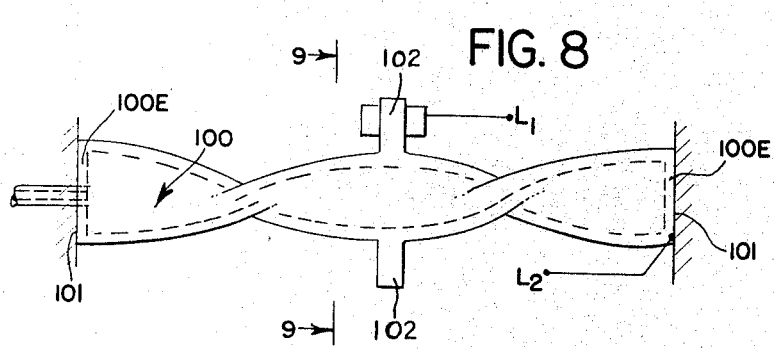
FIGURES 8 and 9 show another embodiment of the invention, FIGURE 8 being a side elevational view and FIGURE 9 a transverse sectional view taken along the line and in the direction of arrows 9—9 of FIGURE 8.
Figure 9:
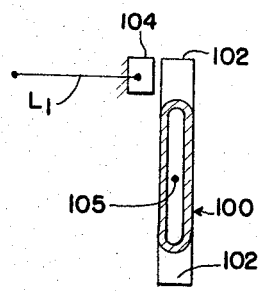

In FIGURES 8 and 9, there is illustrated another form of the invention wherein a flattened tube generally designated 100 is twisted along its axial length so as to provide about one or several full twist turns. The tube is closed off at its ends 100E—100E, and these ends are firmly attached to frames 101—101. The tube is of non-circular configuration, such as the flattened tube configuration as shown in FIGURE 9 and from the "edges" of the flattened tube, and midway between its ends 100E—100E (see FIGURE 9) there are oppositely extending protuberances 102—102 of equal size and mass. Adjacent one of these there is mounted a plate 104 which is firmly held in suitable frame work (not shown) and when line L1 is connected to the plate 104 and line L2 is connected to the tube 100, forces will be induced between the plate and the tube causing the tube to move and to oscillate torsionally (i.e. twist) about the longitudinal axis at the tube, i.e., about the axis through point 105, FIGURE 9. The oscillation will continue so long as power is applied to the oscillator, which can be of the type shown in FIGURE 1.

Figure 10:
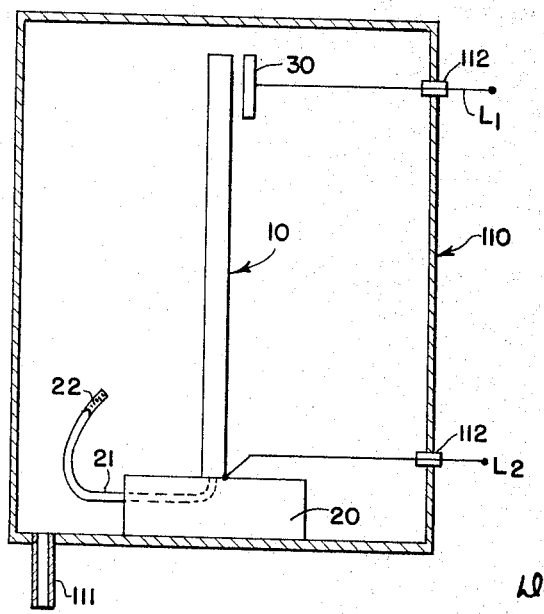
FIGURE 10 is a further embodiment of the invention, and is a side elevational view of the form of vibrating tube, as illustrated in FIGURE 1.

In FIGURE 10 there is illustrated a manner in which pressure may be applied to the outside of the oscillating devices, of the present invention. In this figure there is provided a pressure tight tank 100 having a pressure connection at 111. Within this tank there is mounted one of the oscillating devices, which for purposes of illustration only, is shown as the form of oscillating device shown in FIGURES 1-4, having a mounting 20 and a vibratory tube 10, wherein the vibration is induced by power applied via line L1 to plate 30, line L2 being connected to the tube 10. These lines extend through suitable insulators 111 and 112 through the wall of the tank. The connection 21 to the interior of the tube 10 is sealed off after partial evacuation or after a filling of fluid has been placed in tube 10. Then, when pressure is applied via inlet 111 to the interior of the tank 110, a differential pressure will be applied against the walls of the vibrating tube 10 as effectively as though the pressure had been applied to the interior of tube 10. This cross-sectional shape of tube 10 and hence its stiffness and natural period of vibration will be changed.

It will be understood that the illustration of FIGURE 10 shows only one particular form of vibrating tube 10 (which is the subject of FIGURES 1-4) but any of the forms of vibrating tubes constructed pursuant the present invention may be enclosed in the tank for applying the pressure on the outside of the tube, rather than inside the tube. Thus the forms of vibrating tube shown in FIGURES 6-7 or 8-9 may be enclosed in the tank 110 and pressure applied thereto, pursuant the illustration of FIGURE 10, with equally effective results.

As many widely apparently different embodiments of this invention may be made without departing from the spirit and scope thereof, it is to be understood that I do not limit myself to the specific embodiments disclosed herein.

What is claimed is:

1. In an instrument comprising a tube having a longitudinal axis, said tube being of non-circular cross-section having major and minor axes, said tube being closed at its ends, means connected to at least one end of the tube for fixedly supporting the tube, said supporting means being rigid and engaging said one end at said major and minor axes to prevent motion of said tube at said one end, the remainder of the tube being free, means for vibrating the tube at a resonant frequency in torsion about the longitudinal axis of the tube, means responsive to the vibration of the tube and connectable to an external circuit for sensing said resonant frequency, and means for applying differential pressure to the walls of the tube.

2. The instrument of claim 1 further characterized in that said one end of the tube is peripherally secured to said supporting means.

3. The instrument of claim 1 further characterized in that said tube tube is constructed of a material selected from the group consisting of quartz, germanium and silicon.

References Cited

UNITED STATES PATENTS

| | | | |
|---|---|---|---|
| 2,466,809 | 4/1949 | Hobbs | 73—398 |
| 3,257,850 | 6/1966 | Kooiman | 73—398 |

LOUIS R. PRINCE, *Primary Examiner.*

D. O. WOODIEL, *Assistant Examiner.*